United States Patent

[11] 3,601,236

[72] Inventor Tom Stephenson
 64 Secret Lake Road, Avon, Conn. 06001
[21] Appl. No. 25,835
[22] Filed Apr. 6, 1970
[45] Patented Aug. 24, 1971

[54] GEAR-LOCKING MECHANISM
 10 Claims, 10 Drawing Figs.

[52] U.S. Cl. .................................................. 192/71,
 74/530, 192/67 R, 192/89 A, 192/108
[51] Int. Cl. .................................................. F16d 11/12
[50] Field of Search ........................................ 74/530,
 527; 192/61 R, 71, 89 A, 108

[56] References Cited
 UNITED STATES PATENTS
 2,717,679 9/1955 Johnson ........................ 192/67 R 3,456,516 7/1969 Fisnar et al. .................. 192/71 X

*Primary Examiner*—William F. O'Dea
*Assistant Examiner*—F. D. Shoemaker
*Attorney*—Peter L. Costas ABSTRACT: A gear-locking mechanism includes a rotatable gear and a locking assembly mounted adjacent to the gear and having a set of pawls thereon. The pawls are movable successively toward the teeth and have elements thereon that are engageable therebetween. Offset shoulders are provided on either the teeth of the gear or the engageable portion of one of the pawls, so that the set of pawls may cooperate to lock the gear in any of a large number of rotated positions relative to the locking assembly.

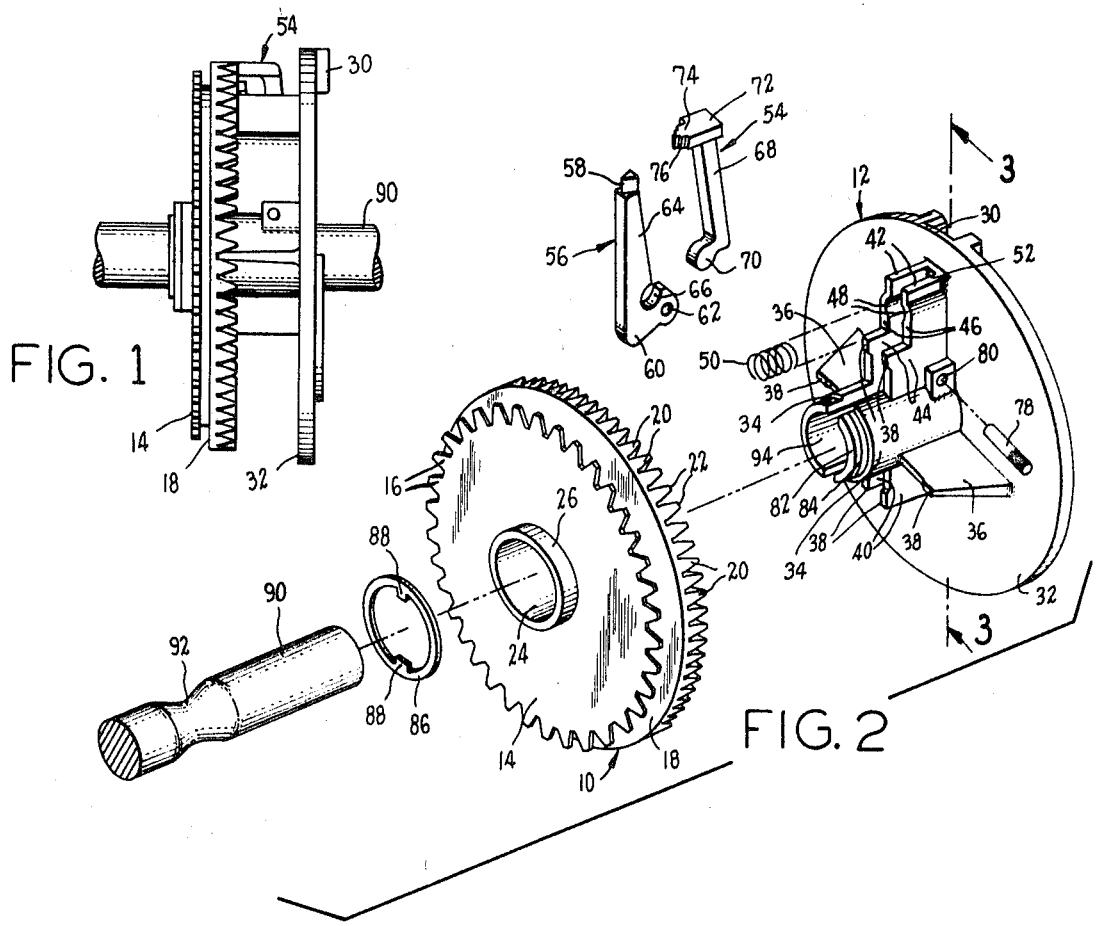
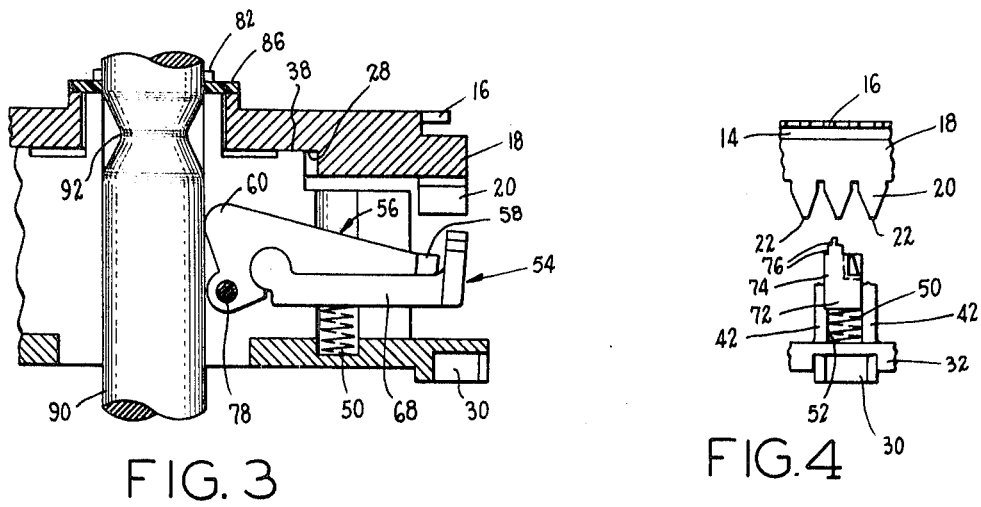

PATENTED AUG 24 1971 3,601,236

INVENTOR
TOM STEPHENSON
BY Peter L. Costas
ATTORNEY

GEAR-LOCKING MECHANISM

BACKGROUND OF THE INVENTION

There are many instances in which it is desirable to quickly and easily interlock relatively moving members in one of a large number of relative positions. One method involves the provision of a multiplicity of aligned and equidistantly spaced teeth on one of the members, and a pawl (or other type of engageable element) on the other member whereby the pawl may be moved into engagement between adjacent teeth. This type of mechanism provides a means of securely interlocking the relatively movable members in a multiplicity of positions depending upon the number of teeth present for engagement, but it is apparent that, if a high level of precision is to be attained, it is necessary that a large number of small teeth be provided. Otherwise, if the movable parts stop in any relative relationship other than one in which the pawl is aligned directly between the teeth, engagement thereof will effect the degree of realignment necessary to achieve such a state; this will result in considerable undesirable movement, the amount of which will depend upon the size and spacing of the teeth.

The design and manufacture of a satisfactory mechanism of the type described, having the requisite number of small teeth necessary to provide an adequate level of precision, entail a number of difficulties and disadvantages. In order to fabricate fine teeth that are sufficiently strong to offer a satisfactory level of durability, it is necessary to utilize relatively hard materials; this tends to render the manufacturing procedure difficult and expensive and therefore impractical in many instances. Furthermore, when the teeth are sufficiently small to provide a reasonable degree of accuracy the shallowness of the spaces therebetween may restrict the depth of penetration of the engagement element thereinto. This greatly renders interengagement quite insecure and thereby tends to restrict the applicability of the mechanism and to make its operation somewhat inaccurate.

Accordingly, it is an object of the present invention to provide a novel gear locking mechanism that permits secure interengagement of the moving parts thereof in a large number of relative positions to provide a high level of accuracy.

It is also an object of the invention to provide such a mechanism that is relatively simple and inexpensive to manufacture, and that is of greatly enhanced durability compared to prior art mechanisms that are intended to perform the same function.

SUMMARY OF THE INVENTION

It has now been found that the foregoing and related objects can be readily attained in a gear-locking mechanism comprising a gear member having a multiplicity of adjacent, generally triangular teeth projecting in one direction from a base surface thereof and defining generally triangular recesses therebetween, and a locking assembly adjacent the gear member. The gear member and locking assembly are mounted for relative movement and the locking assembly has an index member and a follower member mounted thereon for successive movement toward the base surface. Each of the index and follower members has an element thereon registering with the teeth and deeply insertable into the recesses therebetween for engagement to substantially prevent such relative movement. The index element has a generally triangular cross section adapted for cooperation with the recesses to effect such engagement, and the vertical axes of the index and follower elements normal to the base surface are spaced a distance of about half the distance between adjacent teeth of the gear member. The teeth and the index element have flattened tip portions and at least one thereof has offset shoulders defined along the sides to provide generally planar surfaces for abutting contact of the index element on the teeth. In addition, means is provided for successively actuating the index member and follower members, respectively.

In preferred embodiments of the invention, the gear member is a rotatably mounted gear wheel having its teeth aligned circumferentially thereabout, and the teeth may be axially directed inwardly toward the locking assembly. Most desirably, the index and follower members are pivotally mounted pawls and the actuating means is a camming member mounted for sliding movement relative to the pawls and in contact with at least one of them, the pawls being spring biased and operated by a camming surface upon sliding of the camming member. It is particularly preferred that the follower element also have a generally triangular cross section that is adapted for cooperation with the recesses between the teeth to effect interengagement, and that each of the sides of the index element has a plurality of offset shoulders defined therealong. Most desirably the actuating means is a rod that is slidably inserted through apertures in the gear wheel and locking assembly to mount them and to provide an axis of rotation for at least the gear wheel, and in such a mechanism the gear wheel and locking assembly are restrained against relative axial movement on the actuating rod. In a specific embodiment of the invention, the mechanism is utilized in a mechanical counter and a gear wheel is employed therein having means thereon adapted to transfer movement of the gear wheel to a counter number wheel element.

BRIEF DESCRIPTION OF THE DRAWINGS

FIG. 1 of the drawings is a side elevational view of a gear locking mechanism embodying the present invention, with the camming rod thereof fragmentarily illustrated;

FIG. 2 is an exploded perspective view of the mechanism of FIG. 1;

FIGS. 3, 5, and 7 are fragmentary section views through line 3—3 in FIG. 2 and drawn to an enlarged scale, FIG. 3 showing the mechanism in an unlocked condition and FIGS. 5 and 7 showing it in alternative locked conditions;

FIGS. 4, 6, and 8 are fragmentary plan views corresponding to FIGS. 3, 5, and 7 respectively.

DETAILED DESCRIPTION OF THE ILLUSTRATED EMBODIMENT

Figure 5:
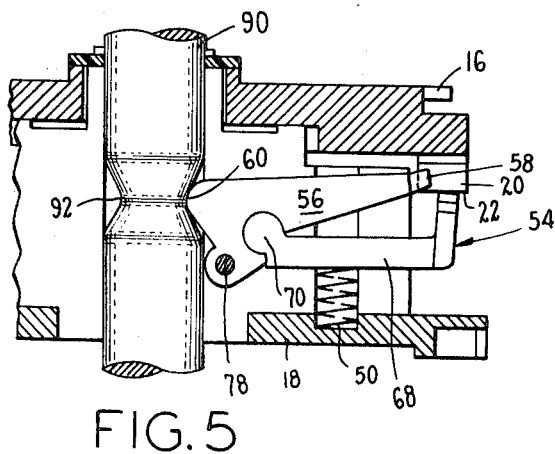

Turning now in detail to the appended drawings, therein illustrated is a gear-locking mechanism embodying the present invention and comprising a gear member and a locking assembly, generally designated by the numerals 10, 12, respectively. The gear member 10 has a circular configuration, and consists of an outer drive portion 14 having a multiplicity of radially extending teeth 16 spaced equidistantly about its circumference, and an inner locking portion 18 having a multiplicity of axially inwardly extending teeth 20 spaced thereabout. As is best seen in FIG. 4, the teeth 20 of the locking portion 18 have substantially flat tips 22, provided for a purpose to be more fully described hereinafter. An axially extending aperture 24 is formed through the center of the gear member 10, and a short cylindrical boss 26 extends outwardly therefrom, lengthening the bearing surface therewithin somewhat. A circumferential recess 28 is formed in the inner surface of the gear member 10 about the aperture 24, and provides a surface for engagement with cooperating portions of the locking assembly, to be described.

The locking assembly 12 includes a housing wheel 32 which, in the illustrated embodiment, is adapted to transmit rotation of the gear member 10 to a computer number wheel; it therefore has a suitable transfer slot 30 adjacent its edge in the outer surface thereof. An axially split cylindrical center post projecting inwardly from the opposite side of the wheel 32 is provided by opposing semicircular elements 34, and support for each element 34 is provided by the gusset 36 projecting radially therefrom and into contact with the housing wheel surface. The tips of the gussets 36 are raised slightly to provide small bearing pads 38, which ride within the circumferential recess 28 of the gear member 10 and contact the surface thereof. Short parallel walls 40 extend from the edge of each of the post elements 34 on one side thereof, and have adjacent their outer ends bearing pads 38 for contact in the recess 28. Longer, stepped parallel walls 42 extend from the edges of the elements 34 on the opposite side of the central post, and bearing pads 38 are formed on the knee portions 44 thereof. The relatively low portions 46 of the longer walls 42 have opposing, generally semicircular grooves 48 extending axially therein, which cooperate to define a cylindrical recess seating a small coil spring 50.

A two-element pawl assembly seated in the channel 52 that is formed between the walls 42 consists of an index pawl and a wedge or follower pawl, generally designated by the numerals 54, 56, respectively. The follower pawl 56 consists of an elongated, generally triangular piece having a wedge element 58 at one end, a nose portion 60 at the opposite end, and a small aperture 62 therebehind. It has a straight back edge 64 that defines the base of the wedge element 58 and extends downwardly therefrom and terminates, near the aperture 62, in a three-fourths round socket 66. The index pawl 54 has an elongated shank 68 with a laterally offset indexing head 72 at one end, and it has at the opposite end thereof a knob 70 dimensioned to seat within the socket 66 of the follower pawl 56 for very limited pivotal movement therein. The head 72 has a generally triangular nose 74 which, in turn, has a series of offset shoulders or steps 76 formed in the sides thereof.

With the knob 70 seated in the socket 66, the pawl assembly is placed in the channel 52 between the walls 42 on the housing wheel 32, and is secured therein by inserting the pivot pin 78 through the apertures 80 (only one of which is visible) in the walls 42 and through the aperture 62 in the follower pawl 56. When so assembled, the coil spring 50 bears upon the rear edge of the index pawl 54 and urges it and the follower pawl 56 inwardly. The gear member 10 is assembled with the locking assembly 12 by inserting the central post of the latter (provided by the elements 34) through the center aperture 24 of the former to bring the bearing pads 38 into contact with the surface of the recess 28 thereabout. The free ends of the post elements 34 that project through the aperture 24 have axially extending recessed portions 82 thereabout, with small grooves 84 formed therein. A plastic snap ring 86, having inwardly extending tabs 88 corresponding to the slots between the post elements 34, is positioned over the recessed portions 82 and is snapped into the grooves 84 to secure the gear member 10 and locking assembly 12 together. An actuating and mounting rod 90 having an intermediate circumferential neck or camming portion 92 is thereafter inserted through the circular passageway 94 that is defined between the post elements 34; the actuating rod 90 is connected to operating means (not shown) for axially sliding the rod 90 through the passageway 94 to operate the gear-locking mechanism, in a manner to be described.

As may be seen in FIGS. 3 and 4, when the actuating rod 90 is in an upper position wherein the nose portion 60 of the follower pawl 56 is out of registry with the neck portion 92 thereof, the full section portion of the rod 90 forces both the index and wedge pawls toward the housing wall 32 against the force of the coil spring 50. The wedge element 58 and the indexing head 72 are thereby maintained out of engagement with the teeth 20 of the locking portion 18 of the gear member 10, allowing independent rotation thereof.

Figure 6:
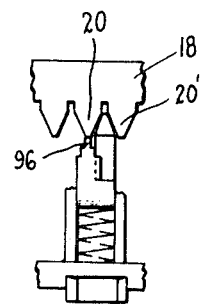

Assuming however that no relative rotation has occurred between the gear member 10 and the locking assembly 12, and with reference to FIGS. 5 and 6, sliding the actuating rod 90 downwardly through the aperture 94 permits the spring 50 to force the nose portion 60 of the follower pawl 56 inwardly into the neck portion 92 toward the axis of the rod 90. Thus, the spring 50 bears against the rear edge of the shank 68 of the index pawl 54, and forces it inwardly toward the teeth 20 of the locking portion 18 until contact with the triangular nose 74 on the head 72 thereof occurs. In the position depicted, such contact has occurred between the outermost element 96 on the triangular nose 74 and the flat tip 22 of the tooth 20 of the locking portion 18. At the instant of contact the outermost element 96 acts as a fulcrum, causing the effect of the spring 50 to shift to the knob 70 at the lower end of the shank 68, thereby forcing the wedge element 58 into the triangular recess defined between adjacent teeth 20, 20' of the locking portion 18. In this instance, the follower pawl 56 performs the primary engaging function and maintains the gear member 10 and locking assembly 12 in precisely the relative position that existed when the rod 90 was activated.

Figure 7:
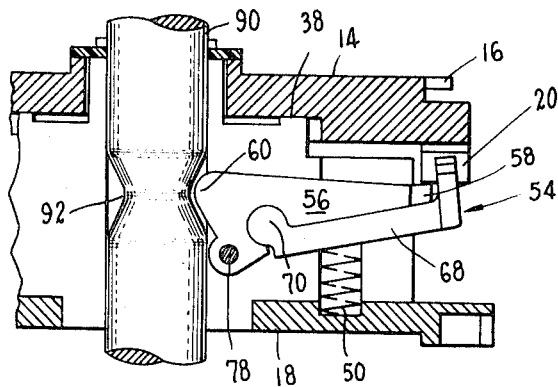
Figure 8:
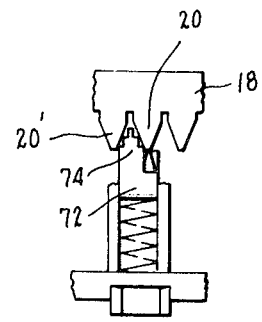

Assuming now that the actuating rod 90 has been moved to the position shown in FIG. 3 and that relative movement has occurred between the gear member 10 and locking assembly 12, so that they have stopped in the relationship illustrated in FIGS. 7 and 8, movement of the actuating rod 90 downwardly to present the neck portion 92 to the nose portion 60 causes the mechanism to lock in a different manner. Thus, the entire triangular nose 74 of the indexing head 72 is precisely aligned between adjacent teeth 20, 20' of the locking portion 18, thereby permitting the nose 74 to fully engage in the recess defined; in such a manner, the index pawl 54 itself is effective to lock the otherwise relatively moveable members together.

Figure 9:
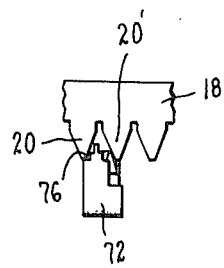
FIGS. 9 and 10 are similar to FIGS. 4, 6, and 8, and illustrate two other positions in which the mechanism may be locked.
Figure 10:
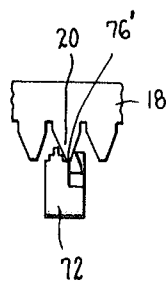

Turning now to FIG. 9, the gear member 10 and locking assembly 12 have been rotated to such a position that when the actuating rod 90 is moved to present the neck portion 92 to the nose portion 60, the indexing head 72 is so positioned that it moves inwardly only to the point where the flat tip 22 of the tooth 20 abuts upon the shoulder 76 near the base thereof. Upon this occurrence, the wedge element 58 of the follower pawl 56 moves partially into the recess between the teeth 20, 20', and thereby cooperates with the indexing head 72 to prevent relative movement in either direction between the gear member 10 and the locking assembly 12. Similarly, with reference to FIG. 10, the moveable members are positioned in such a manner that a second shoulder 76' on the opposite side of the indexing head 72 has initially contacted the tip 22 of the tooth 20. As a result, movement of the wedge element 58 inwardly has the effect of trapping the tip of the tooth 20 between it and the triangular nose 74 of the indexing head, thereby preventing relative movement between the gear member 10 and the locking assembly 12. Although not specifically described, it will be appreciated that if the initial contact occurs between shoulders 76 on the indexing head 72 other than those specifically referred to, the operation would be the same as has been described. In such case, the difference resides primarily in the extent to which the wedge element 58 of the follower pawl 56 enters into the space between the teeth 20.

Although other arrangements of the inwardly directed steps, or shoulders, may be utilized, the illustrated construction is particularly preferred because the shoulders are most readily provided on the index pawl, and the number thereof shown (i.e., two on each side of the pawl) has been determined to offer an optimum balance of operational accuracy and simplicity of construction, although more or fewer shoulders could be provided. It will be appreciated from the foregoing description that the effect of the shoulders is to multiply the number of positions in which the mechanism may be locked without sacrificing strength or durability, since the teeth of the gear element need not be of reduced size or strength for the purpose of affording accuracy, and both of the pawls function in a desirable manner even though they are of relatively hefty construction. The follower pawl not only makes interlocking possible when the index pawl is directly aligned with a tooth (as would be impossible in its absence) but it also cooperates with the index pawl either as a wedge between two adjacent teeth or a trap in which a single tooth may be captured. Ideally, the engageable element of the follower pawl is wedge-shaped or triangular in cross section, to facilitate and ensure deep penetration thereof in the recesses between the teeth, but other configurations are also feasible as long as the depth of penetration possible therewith is adequate.

In most cases the gear member will be a wheel of the type illustrated, mounted for rotation adjacent to the locking assembly. However, the gear member may have virtually any configuration on which a multiplicity of teeth may be aligned and may, for example, be a rack that cooperates with suitably mounted pawls of the type illustrated. It will be obvious that the concept of the present invention is therefore applicable to a wide variety of machines and devices involving repeated engagement and disengagement of relatively moveable members, and in which reengagement in numerous precise relationships is desired. However, in the interest of illustrating the practical usage of the invention, a specific instance thereof will be described hereinafter.

As has been pointed out with reference to the drawings, the housing wheel 32 of the locking assembly 12 may be provided with a slot 30 to enable transfer from the gear member 10 to a computer number wheel, such as through a transfer pinion. Such a mechanism may be utilized in conventional gasoline pump computers, wherein the gear member 10 is driven from the pump motor through the outer drive portion 14. When the pump is operating to dispense gasoline, the locking mechanism is engaged to drive the number wheels of the computer so as to record the cost of each sale (and normally also the volume of gasoline pumped). At the end of each sale, and after the pump is stopped, it is necessary to reset the computer so that the number wheels register zero for the next sale; this requires disengagement of the locking mechanism (in the manner described hereinbefore) for rotation of the locking assembly 12 independently of the gear member 10. However, when the zero condition of the computer is attained it is necessary to reengage the locking assembly 12 and the gear member 10 precisely in the existing relationship thereof, and the mechanism of the present invention is, as has previously been explained, adapted to do so repeatedly and with a high degree of accuracy.

Thus, it can be seen that the present invention provides a novel gear locking mechanism that permits secure interengagement of the moving parts thereof in an extensive number of relationships to provide a high level of accuracy. The mechanism is relatively simple and inexpensive to manufacture, and is of greatly enhanced durability compared to prior art mechanisms that are intended to perform the same function.

Having thus described the invention, I claim:

1. A gear-locking mechanism comprising: a gear member having a multiplicity of adjacent, generally triangular teeth projecting in one direction from a base surface thereof and defining generally triangular recesses therebetween; a locking assembly adjacent said gear member, said gear member and locking assembly being mounted for relative movement and said locking assembly having an index member and a follower member mounted thereon for successive movement toward said base surface, each of said index and follower members having an element thereon registering with said teeth and deeply insertable into said recesses therebetween for engagement to substantially prevent such relative movement, said index element having a generally triangular cross section adapted for cooperation with said recesses to effect such engagement and the vertical axes of said index and follower elements normal to the base surface being spaced a distance of about half the distance between said teeth, each of said teeth and said index element having flattened tip portions and at least one of said teeth and index element having offset shoulders defined along the sides thereof to provide generally planar surfaces for abutting contact of said index element on said teeth; and means for successively actuating said index and follower members, respectively.

2. The mechanism of claim 1 wherein said gear member is a rotatably mounted gear wheel having said teeth aligned circumferentially thereabout.

3. The mechanism of claim 2 wherein said teeth are axially directed inwardly toward said locking assembly.

4. THe mechanism of claim 1 wherein said index and follower members are pivotally mounted pawls.

5. The mechanism of claim 4 wherein said actuating means is a camming member mounted for sliding movement relative to said pawls and in contact with at least one thereof, said pawls being spring biased and being operated by a camming surface upon sliding movement of said camming member.

6. The mechanism of claim 4 wherein said follower element also has a generally triangular cross section adapted for cooperation with said recesses to effect such engagement, and wherein each of said sides of said index element has a plurality of said offset shoulders defined therealong.

7. The mechanism of claim 1 wherein said gear member is a gear wheel having said teeth aligned circumferentially thereabout and having a central aperture therethrough, wherein said locking assembly has a mounting aperture therethrough, and wherein said actuating means is a rod having a camming surface defined therein, said rod being inserted through said apertures to slidably mount said gear wheel and locking assembly and to provide an axis of rotation for at least said gear wheel, said gear wheel and locking assembly being restrained against relative axial movement thereon.

8. In a mechanical counter, a gear-locking mechanism comprising: a gear wheel having a multiplicity of equidistantly spaced, generally triangular teeth aligned circumferentially thereabout, projecting in one direction from a base surface thereof and defining generally triangular recesses therebetween; a locking assembly adjacent said gear wheel and having means thereon adapted for transfer of movement of said wheel to a counter number wheel element, said gear wheel locking assembly being mounted for relative rotation and said locking assembly having an index member and a follower member mounted thereon for successive movement toward said base surface, each of said index and follower members having an element thereon registering with said teeth and deeply insertable into said recesses therebetween for engagement to substantially prevent such relative rotation and thereby effect such transfer of movement, said index element having a generally triangular cross section adapted for cooperation with said recesses to effect such engagement and the vertical axes of said index and follower elements normal to the base surface being spaced a distance of about half the distance between said teeth, each of said teeth and said index element having flattened tip portions and said index element having offset shoulders defined along the sides thereof to provide generally planar surfaces for abutting contact of said index element on said teeth; and a rod slidably inserted through said gear wheel and locking assembly to provide an axis of rotation therefor; said rod having a camming surface defined thereon for successively actuating said index and follower members, respectively, upon sliding movement relative thereto.

9. The mechanism of claim 8 wherein said teeth are axially directed inwardly toward said locking assembly and wherein said index and follower members are pivotally mounted pawls.

10. The mechanism of claim 9 wherein said follower element also has a generally triangular cross section adapted for cooperation with said recesses to effect such engagement, and wherein each of said sides of said index element has a plurality of said offset shoulders defined therealong.